(12) United States Patent
Santin Navarro et al.

(10) Patent No.: US 10,272,867 B2
(45) Date of Patent: Apr. 30, 2019

(54) MOUNTING ENVELOPE

(71) Applicant: Dalphi Metal Espana S.A., Madrid (ES)

(72) Inventors: Pedro Jose Santin Navarro, Vigo (ES); Maria del Mar Rodilla, Vigo (ES)

(73) Assignee: Dalphi Metal Espana S.A., Vigo (ES)

(*) Notice: Subject to any disclaimer, the term of this patent is extended or adjusted under 35 U.S.C. 154(b) by 38 days.

(21) Appl. No.: 15/115,289

(22) PCT Filed: Feb. 19, 2015

(86) PCT No.: PCT/EP2015/000366
§ 371 (c)(1),
(2) Date: Jul. 29, 2016

(87) PCT Pub. No.: WO2015/124298
PCT Pub. Date: Aug. 27, 2015

(65) Prior Publication Data
US 2017/0001591 A1 Jan. 5, 2017

(30) Foreign Application Priority Data
Feb. 20, 2014 (EP) .................... 14000601

(51) Int. Cl.
B60R 21/213 (2011.01)
B60R 21/201 (2011.01)
(Continued)

(52) U.S. Cl.
CPC .......... B60R 21/213 (2013.01); B60R 21/201 (2013.01); B60R 21/217 (2013.01);
(Continued)

(58) Field of Classification Search
CPC . B60R 21/213; B60R 21/201; B60R 21/2165; B60R 21/232; B60R 21/215;
(Continued)

(56) References Cited

U.S. PATENT DOCUMENTS 5,062,663 A * 11/1991 Satoh ................ B60R 21/215
280/728.3
5,242,192 A * 9/1993 Prescaro ............. B60R 21/16
280/730.1

(Continued)

FOREIGN PATENT DOCUMENTS

| EP | 1564083 | 8/2005 |
| EP | 1580085 | 9/2005 |
| JP | 2002370606 | 12/2002 |

Primary Examiner — Paul N Dickson
Assistant Examiner — Timothy Wilhelm
(74) Attorney, Agent, or Firm — Tarolli, Sundheim, Covell & Tummino LLP

(57) ABSTRACT

The present invention provides for a mounting envelope (1) for receiving a curtain-airbag and for attaching the curtain-airbag to the interior of a vehicle, in particular to the roof frame of a vehicle. The mounting envelope (1) comprises a longitudinal tear-line (3) which is configured to break in the event of a curtain air-bag deployment and extends in a longitudinal direction (L) of the mounting envelope. The mounting envelope is characterized in that it covers at least a major part of a curtain-airbag and in that it comprises at least additional vertical tear-line (7), preferably extending in a direction (V) substantially perpendicular to the longitudinal direction (L).

15 Claims, 1 Drawing Sheet

(51) Int. Cl.
   *B60R 21/232* (2011.01)
   *B60R 21/2165* (2011.01)
   *B60R 21/217* (2011.01)
   *B60R 21/00* (2006.01)

(52) U.S. Cl.
   CPC ........ B60R 21/2165 (2013.01); B60R 21/232 (2013.01); *B60R 2021/0006* (2013.01); *B60R 2021/0032* (2013.01)

(58) Field of Classification Search
   CPC .............. B60R 21/2176; B60R 21/217; B60R 2021/0006; B60R 21/20
   See application file for complete search history.

(56) References Cited

U.S. PATENT DOCUMENTS

| | | | |
|---|---|---|---|
| 5,957,487 A | 9/1999 | Stutz | |
| 6,099,026 A * | 8/2000 | Ando | B60R 21/201 280/728.1 |
| 6,145,879 A * | 11/2000 | Lowe | B60R 21/20 280/743.1 |
| 6,224,090 B1 * | 5/2001 | Lutze | B60R 21/2165 280/728.3 |
| 6,237,936 B1 * | 5/2001 | Quade | B60R 21/207 280/728.2 |
| 6,293,581 B1 * | 9/2001 | Saita | B60R 21/213 280/730.2 |
| 6,672,612 B2 * | 1/2004 | Sauer | B60R 21/232 280/730.2 |
| 6,945,556 B2 * | 9/2005 | Maertens | B60R 21/232 280/729 |
| 6,948,735 B2 * | 9/2005 | Hwang | B60R 21/201 280/728.2 |
| 7,011,337 B2 * | 3/2006 | Aoki | B60R 21/04 280/728.2 |
| 7,014,209 B2 * | 3/2006 | Muller | B60R 21/2165 280/728.3 |
| 7,025,374 B2 * | 4/2006 | Evans | B60R 21/2165 280/728.3 |
| 7,029,025 B2 * | 4/2006 | Schwark | B60R 21/2165 280/728.3 |
| 7,083,188 B2 * | 8/2006 | Henderson | B60R 21/201 280/728.2 |
| 7,159,896 B2 * | 1/2007 | Ochiai | B60R 21/201 280/730.2 |
| 7,163,231 B2 * | 1/2007 | Kumagai | B60R 21/201 280/728.3 |
| 7,213,837 B2 * | 5/2007 | Clarke | B60R 21/20 280/731 |
| 7,267,361 B2 * | 9/2007 | Hofmann | B60R 21/213 24/293 |
| 7,357,408 B2 * | 4/2008 | Hall | B60R 21/213 280/728.2 |
| 7,407,182 B2 * | 8/2008 | Aoki | B60R 21/201 280/728.1 |
| 7,497,463 B2 * | 3/2009 | Kaulbersch | B26F 1/24 280/728.3 |
| 7,614,646 B2 * | 11/2009 | Hill | B60R 21/201 280/728.2 |
| 7,748,732 B2 * | 7/2010 | Sella | B60R 21/201 280/728.3 |
| 7,748,734 B2 * | 7/2010 | Wilmot | B60R 21/201 280/728.2 |
| 8,002,310 B2 * | 8/2011 | Quach | B60R 21/201 280/730.2 |
| 8,006,998 B2 * | 8/2011 | Hatfield | B60R 21/232 280/730.2 |
| 8,414,020 B2 * | 4/2013 | Beppu | B60R 21/232 280/728.2 |
| 8,424,903 B2 * | 4/2013 | Kaneda | B60R 13/02 280/728.3 |
| 8,430,421 B2 * | 4/2013 | Kirchen | F16B 21/082 280/728.2 |
| 8,585,078 B1 | 11/2013 | Witt, Jr. et al. | |
| 8,789,848 B2 * | 7/2014 | Takagi | B60R 21/237 280/728.2 |
| 9,022,418 B2 * | 5/2015 | Topart | B60R 21/213 280/728.3 |
| 9,376,082 B2 * | 6/2016 | Osterfeld | B60R 21/2176 |
| 9,580,036 B2 * | 2/2017 | Choi | B60R 21/213 |
| 9,616,840 B2 * | 4/2017 | Arellano | B60R 21/215 |
| 9,663,057 B2 * | 5/2017 | Aust | B60R 21/2165 |
| 9,663,063 B2 * | 5/2017 | Kunitake | B60R 21/201 |
| 2002/0125700 A1 * | 9/2002 | Adkisson | B60R 21/18 280/733 |
| 2002/0163169 A1 | 11/2002 | Fischer | |
| 2003/0184057 A1 * | 10/2003 | Kumagai | B60R 21/201 280/728.3 |
| 2004/0160043 A1 * | 8/2004 | Litjens | B29C 43/021 280/732 |
| 2004/0201207 A1 * | 10/2004 | Ochiai | B60R 21/201 280/730.2 |
| 2007/0046007 A1 * | 3/2007 | Zarazua | B60R 21/20 280/743.1 |
| 2007/0102912 A1 * | 5/2007 | Bowers | B60R 21/213 280/740 |
| 2009/0102166 A1 * | 4/2009 | Brown | B60R 21/201 280/728.2 |
| 2016/0280177 A1 * | 9/2016 | Young | B60R 21/232 |

* cited by examiner

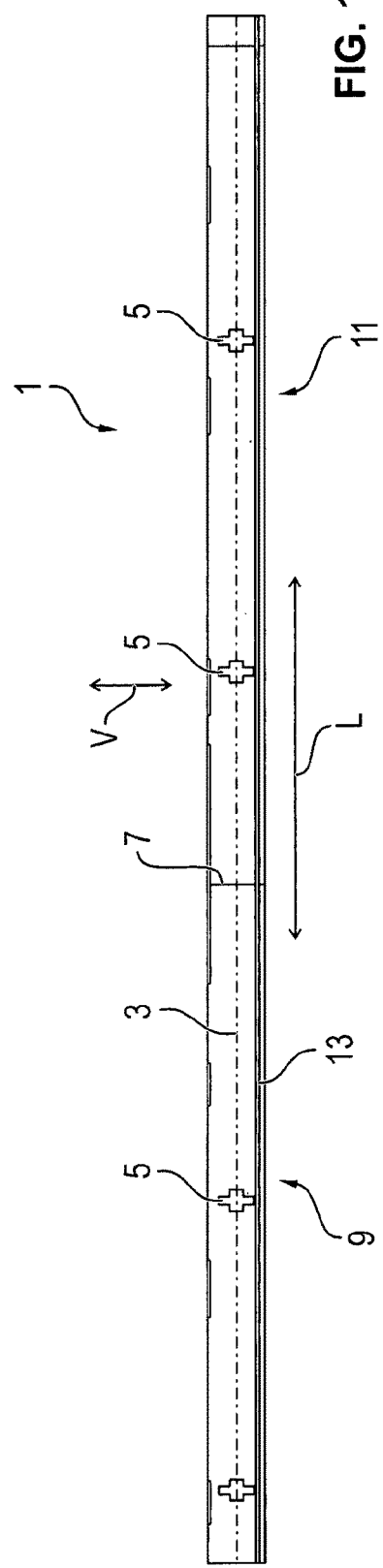
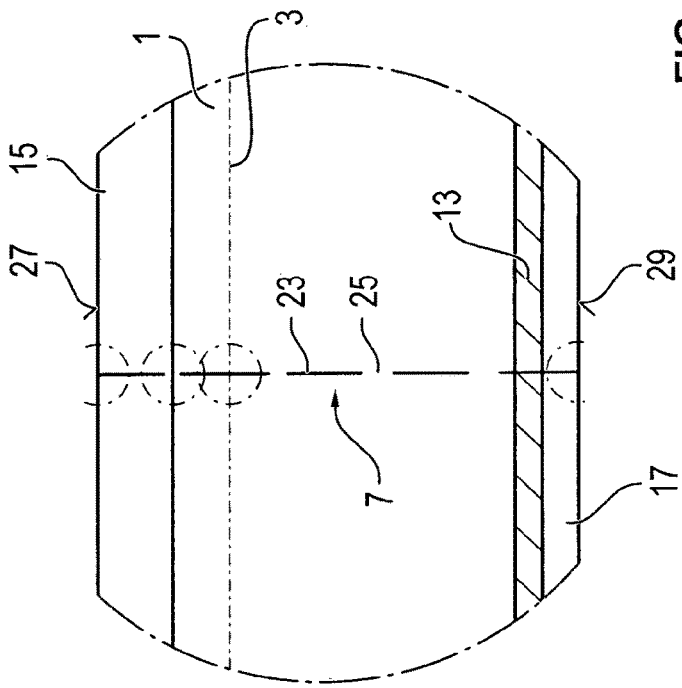
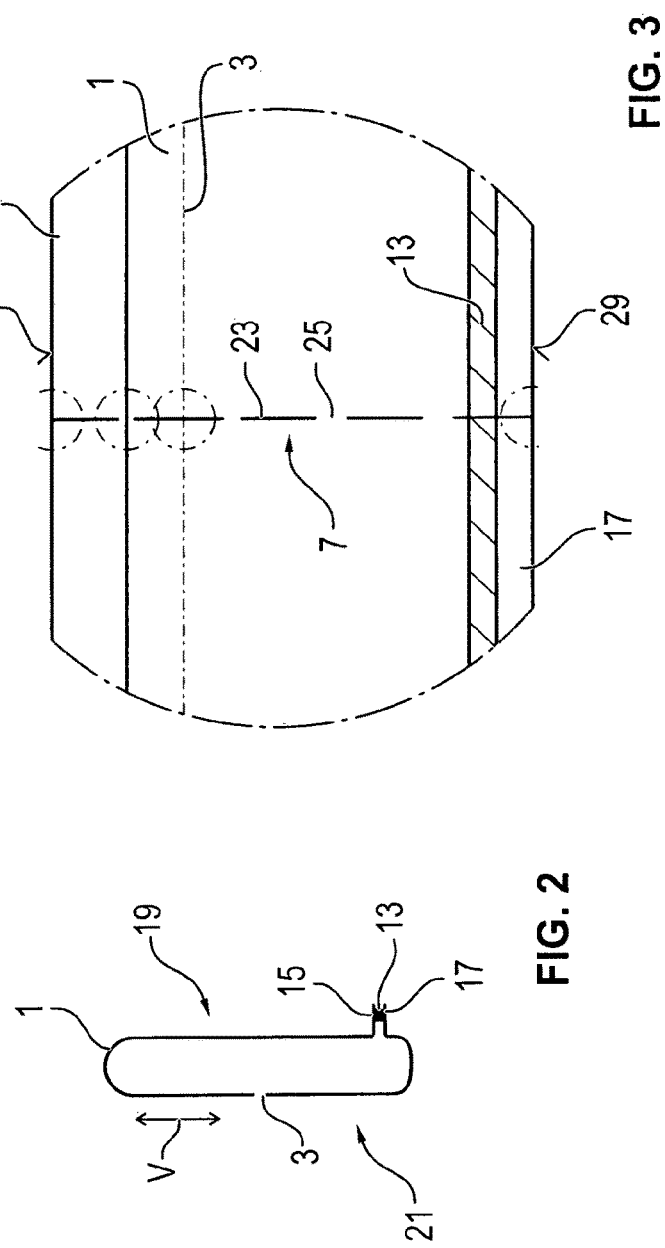

MOUNTING ENVELOPE

RELATED APPLICATION

This application corresponds to PCT/EP2015/000366, filed Feb. 19, 2015, which claims the benefit of European Application No. 14000601.6, filed Feb. 20, 2014, the subject matter of which is incorporated herein by reference in their entireties.

The present invention relates to a mounting envelope for receiving a curtain-airbag according to the preamble of claim 1, a curtain-airbag module according to claim 14 and a vehicle according to claim 15.

Mounting envelopes are, for example, known from EP 0 798 168 B1. They serve for securely stowing an elongated curtain-airbag in the interior of a vehicle and to prevent at least parts of the airbag from being trapped in the interior trim when the airbag starts deploying. It is known in the art to provide a mounting envelope for a curtain-airbag with a longitudinal tear-line, which is configured to break in the event of a curtain-airbag deployment. Problems of these mounting envelopes particularly arise for curtain-airbags that comprise a centrally arranged inflator between a rear part and a front part of the curtain-airbag. During the manufacturing of a curtain-airbag module comprising a curtain-airbag and a mounting envelope, the mounting envelope needs to be imposed on the rear part and the front part of the curtain-airbag. This is usually done by automatically imposing one mounting envelope from one end and another mounting envelope from the opposite end on the (automatically) folded curtain-airbag. Thus, automatically providing a curtain-airbag with a mounting envelope in an industrial process requires two separate steps and thus, renders the manufacturing of a curtain-airbag not only complicated, but in addition time-consuming.

It is therefore an object of the present invention to provide a mounting envelope, which can automatically be imposed on a curtain airbag in a single manufacturing step and which nevertheless provides a safe and reliable bursting of the mounting envelope in the event of curtain-airbag deployment.

As a solution to the above object, the present invention provides a mounting envelope comprising the features of claim 1. The mounting envelope serves for receiving a curtain-airbag and for attaching the curtain-airbag to a vehicle, in particular to the interior roof frame of a vehicle. The mounting envelope comprises a longitudinal tear-line which is configured to break in the event of a curtain-airbag deployment and extends in a longitudinal direction of the mounting envelope. The mounting envelope according to the present invention is characterised in that it covers at least a major part of a curtain-airbag and comprises at least one additional vertical tear-line, preferably extending in a direction substantially perpendicular to the longitudinal direction.

An important aspect of the present invention is that the mounting envelope is adapted to be imposed on at least a major part of a curtain-airbag in only one manufacturing step. The imposing of the mounting envelope on the curtain-airbag may thus be performed quickly in one single fully automatic step without any delays due to imposing a second mounting envelope on the elongated curtain-airbag. Owing to the vertical tear-line, the mounting envelope provides for a reliable and high quality bursting in case of curtain-airbag deployment. Thus, the present invention provides an advantageous combination of a mounting envelope, which can easily and quickly be imposed at least on a major part of a curtain-airbag and which provides at the same time a reliable functionality.

In a preferred configuration of the present invention, the mounting envelope is formed from one piece of fabric, wherein the fabric may be flexible. Preferably, the vertical tear-line is arranged in a centre portion of the mounting envelope with respect to a longitudinal direction thereof. Furthermore, the vertical tear-line may span at least a part of the mounting envelope in a circumferential direction thereof. Preferably, the mounting envelope has a substantial tubular shape or is at least shaped such that it fits on the folded curtain-airbag, which extends in a longitudinal direction. Furthermore, the lateral edges of the mounting envelope may be welded, glued or sewed together so as to result in a substantially tubular shape thereof. In a further preferred configuration, the welding line extends in the longitudinal direction of the mounting envelope. The vertical tear-line may be arranged such that it crosses the welding line.

In order to provide a secure breaking of the vertical tear-line in the event of curtain-airbag deployment, the vertical tear-line preferably comprises alternating cut and non-cut portions. In this configuration, a cut portion of the vertical tear-line may cross at least one, preferably both lateral edges of the mounting envelope. Thereby, the reliability of mounting envelope bursting in a case of curtain-airbag deployment can be further increased. Furthermore, in a preferred configuration, a non-cut portion of the vertical tear-line crosses the longitudinal tear-line of the mounting envelope. In a further advantageous configuration of the invention, the non-cut portions are shorter than the cut portions of the vertical tear-line. In this case, the reliability of mounting envelope bursting during curtain-airbag deployment can be further increased.

In another configuration of the invention, the mounting envelope is adapted to receive and cover a curtain-airbag which comprises a centrally arranged inflator between a rear part and a front part of the curtain airbag. Furthermore, the vertical tear-line may substantially be aligned with an inflator position of a curtain-airbag received by the mounting envelope. Additionally, the mounting envelope may comprise one or more openings for providing a view on a curtain airbag located inside the mounting envelope and for attaching the mounting envelope to a vehicle by means of adapted fixation means such as screws or the like.

In order to solve the above object, the present invention also provides for a curtain-airbag module comprising a curtain airbag having a centrally arranged inflator and a mounting envelope according to the present invention. In this case, the vertical tear-line is preferably arranged close to the inflator and may be flushing therewith.

Furthermore, a vehicle according to the present invention is provided, in particular an automotive vehicle, which comprises at least one curtain-airbag module according to the present invention.

The invention is in the following described by means of the drawings, which are as follows:

FIG. 1 A schematic side view of the mounting envelope according to the present invention;

FIG. 2 A schematic cross-sectional view of the mounting envelope, and

FIG. 3 A detailed view of a vertical tear-line according to the present invention.

FIG. 1 shows a schematic side view of a mounting envelope 1 according to the present invention. The mounting envelope 1 has an elongated shape and extends in a longitudinal direction L. The mounting envelope's size and shape is adapted to a respective curtain-airbag to be positioned inside of the hollow mounting envelope. Thus, the mounting envelope is adapted to be imposed on a curtain-airbag and to be attached with the curtain-airbag to the interior of a vehicle, in particular to a roof frame of a vehicle (not shown in the figure). In principle, the mounting envelope may also be used in connection with an external curtain-airbag.

The mounting envelope 1 comprises a longitudinal tear-line 3, which extends in the longitudinal direction L, and in particular runs over the entire length of the mounting envelope 1. The longitudinal tear-line 3 comprises alternating cut and non-cut portions which constitute a breaking line. Thus, in the event of curtain-airbag deployment, a pressure will be exerted on the tear-line, which as a result will break. The mounting envelope 1 further comprises four openings 5, which are substantially regularly distributed in the longitudinal direction of the mounting envelope. In the present example, the openings 5 have a cross shape and serve for fixing the mounting envelope 1 to a vehicle and/or for providing a view on a folded curtain-airbag located inside the mounting envelope 1.

The mounting envelope 1 further comprises a vertical tear-line 7, which in the illustrated example extends in a direction substantially perpendicular to the longitudinal direction L. In FIG. 1, this perpendicular direction is referred to with the arrow V and stands for a vertical and/or circumferential direction of the mounting envelope.

As can be seen, the mounting envelope 1 shown in FIG. 1 comprises only one vertical tear-line 7, which is substantially centrally arranged with respect to the longitudinal direction L of the mounting envelope 1. In case that the mounting envelope 1 serves to be imposed on a curtain-airbag having a substantially centrally arranged inflator, the vertical tear-line 7 is preferably arranged such on the mounting envelope 1, that it is aligned with the inflator of the curtain-airbag. In this configuration, the vertical tear-line 7 substantially divides the mounting envelope 1 into a front part 9 and a rear part 11. Furthermore, the mounting envelope 1 requires an opening for the one or more inflators, which is not illustrated in the figures.

In an alternative configuration, the mounting envelope 1 may comprise two or more vertical tear-lines. In particular, the mounting envelope 1 may comprise two vertical tear-lines, which may include an angle or which may be arranged substantially parallel to each other, thereby enclosing the inflator of the curtain-airbag. Thus, it should be understood that the term "vertical" in the context of the present invention does not mean that the additional tear-line is necessarily perpendicular to the longitudinal direction. Rather, the term "vertical" is to be understand such that the vertical tear-line and the longitudinal tear-line or the longitudinal direction L include an angle with each other, wherein the angle may preferably be in the range of 45° to 90°, more preferably in the range of 75° to 90°, and in particular approximately 90°.

The mounting envelope 1 further comprises a welding line 13, which results from connecting, in particular welding two lateral end portions 15, 17 of the mounting envelope 1 together in a longitudinal direction L.

FIG. 2 shows a schematic cross-sectional view of the mounting envelope 1 according to the present invention. As can be seen, the mounting envelope 1 has a substantially oval or tubular cross-section. Owing to its tubular shape, the mounting envelope 1, which is preferably made from a flexible material, can easily be imposed on a folded curtain-airbag in the longitudinal direction L thereof.

In a condition, where the mounting envelope 1 is imposed on a folded curtain airbag and attached to the interior, in particular to a roof frame of a vehicle, the rear side 19 of the mounting envelope comprising the welding line 13 is preferably facing a roof frame. On the other hand, a front side 21 of the mounting envelope comprising the longitudinal tear-line 3 as well as the vertical tear-line 7 preferably faces the interior trim of the vehicle. It is also possible to attach the mounting envelope 1 to the external surface of an interior trim.

As can be seen from FIG. 2, the longitudinal tear-line 3 is substantially arranged centrally on the front side 21 in the vertical direction V of the mounting envelope 1. In an installed condition, the mounting envelope 1 may extend below the interior trim of the vehicle along the A-pillar, along the roof frame and along the C-pillar.

FIG. 3 shows a detailed view of the vertical tear-line 7 according to the present invention. As can be seen from FIG. 3, the vertical tear-line 7 comprises a perforated or pre-cut structure comprising cut portions 23 and non-cut portions 25, wherein the cut portions 23 and non-cut portions 25 are alternatingly arranged to form the vertical tear-line 7. As can be seen from FIG. 3, the non-cut portions comprising the material of the mounting envelope 1 may be shorter than the cut portions 23 in order to improve the breaking effect of the mounting envelope in case of curtain-airbag deployment.

Furthermore, a cut portion 23 crosses lateral side edges 27 and 29, wherein the lateral side edges 27, 29 are arranged on opposite sides of the mounting envelope in the lateral end portions 15 and 17. Furthermore, cut portions are preferably provided across the welding line 13 as well as across the longitudinal tear-line 3.

The vertical tear-line 7 may be arranged entirely in the circumferential direction of the mounting envelope 1. However, for improving the breaking effect of the mounting envelope 1 it may also be sufficient to provide a vertical tear-line 7 on the front side 21 of the mounting envelope 1.

As indicated above, the present invention is not restricted to a mounting envelope 1 comprising a single vertical tear-line. Rather, the mounting envelope 1 may comprise two or more vertical tear-lines, which are substantially arranged in parallel or under an angle along the longitudinal direction L of the mounting envelope 1. Preferably, the mounting envelope 1 comprises as many vertical tear-lines 7 as inflators are provided on the curtain-airbag, which is to be received by the mounting envelope. In this case, each vertical tear-line 7 is preferably aligned and thus substantially flushes with the respective inflators.

In conclusion, the present invention provides for an advantageous mounting envelope 1, which may easily be automatically imposed on a curtain-airbag. In principle, it is also possible to include more than one airbag in the mounting envelope 1 according to the present invention. Any problem regarding the bursting of the mounting envelope 1 owing to the single piece form of the mounting envelope can be avoided by means of the vertical tear-line 7, which extends in a vertical direction of the mounting envelope 1. Owing to this configuration, the mounting envelope 1 will break-up in two separate portions in the event of curtain-airbag deployment.

LIST OF REFERENCE NUMERALS

1 Mounting envelope
3 Longitudinal tear-line
5 Opening
7 Vertical tear-line
9 Front part
11 Rear part 13 Welding line
15 Lateral end portion
17 Lateral end portion
19 Rear side
21 Front side
23 Cut portion
25 Non-cut portion
27 Lateral side edge
29 Lateral side edge
L Longitudinal direction
V Vertical/circumferential direction

The invention claimed is:

1. Mounting envelope (1) for receiving a curtain-airbag and for attaching the curtain-airbag to the interior of a vehicle, the mounting envelope comprising a longitudinal tear-line (3) which is configured to break in the event of a curtain-airbag deployment and extends in a longitudinal direction (L) of the mounting envelope, wherein the mounting envelope covers at least a major part of a curtain-airbag and comprises at least one additional vertical tear-line (7) extending in a direction (V) substantially perpendicular to the longitudinal direction (L), the vertical tear-line (7) comprising alternating cut (23) and non-cut (25) portions.

2. Mounting envelope according to claim 1, wherein the mounting envelope is formed in one piece of fabric.

3. Mounting envelope according to claim 1 wherein the vertical tear-line (7) is arranged in a center portion of the mounting envelope (1) with respect to a longitudinal direction (L) thereof.

4. Mounting envelope according to claim 1, wherein the vertical tear-line (7) spans at least a part of the mounting envelop in a circumferential direction thereof.

5. Mounting envelope according to claim 1, wherein the mounting envelope has a substantially tubular shape.

6. Mounting envelope according to claim 1, wherein at least one of the cut portions (23) of the vertical tear-line (7) crosses at least one of the lateral side edges (27, 29) of the mounting envelope.

7. Mounting envelope according to claim 1 wherein a cut portion (23) of the vertical tear-line (7) crosses the longitudinal tear-line (3) of the mounting envelope.

8. Mounting envelope according to claim 7, wherein the non-cut portions are shorter than the cut portions of the vertical tear-line.

9. Mounting envelope according to claim 1, wherein the mounting envelope is adapted to receive and cover a curtain-airbag which comprises a centrally arranged inflator between a rear part and a front part of the curtain-airbag.

10. Mounting envelope according to claim 1, further comprising one or more openings (5) for providing a view on a curtain-airbag located inside the mounting envelope and for attaching the mounting envelope to a vehicle.

11. Curtain-airbag module comprising a curtain-airbag having a centrally arranged inflator and a mounting envelope (1) according to claim 1.

12. Vehicle at least one curtain-airbag module according to claim 11.

13. Mounting envelope according to claim 1, wherein the mounting envelop attaches the curtain-airbag to a roof frame of the vehicle.

14. Mounting envelope (1) for receiving a curtain-airbag and for attaching the curtain-airbag to the interior of a vehicle, the mounting envelope comprising a longitudinal tear-line (3) which is configured to break in the event of a curtain-airbag deployment and extends in a longitudinal direction (L) of the mounting envelope, wherein the mounting envelope covers at least a major part of a curtain-airbag and comprises at least one additional vertical tear-line (7) extending in a direction (V) substantially perpendicular to the longitudinal direction (L), wherein the vertical tear-line (7) crosses a welding line (13) extending in the longitudinal direction (L) of the mounting envelope.

15. Mounting envelope (1) for receiving a curtain-airbag and for attaching the curtain-airbag to the interior of a vehicle, the mounting envelope comprising a longitudinal tear-line (3) which is configured to break in the event of a curtain-airbag deployment and extends in a longitudinal direction (L) of the mounting envelope, wherein the mounting envelope covers at least a major part of a curtain-airbag and comprises at least one additional vertical tear-line (7) extending in a direction (V) substantially perpendicular to the longitudinal direction (L), wherein the vertical tear-line (7) is substantially aligned with an inflator-position of a curtain-airbag received by the mounting envelope.

* * * * *